US011208066B2

United States Patent
Freienstein et al.

(10) Patent No.: US 11,208,066 B2
(45) Date of Patent: Dec. 28, 2021

(54) DEVICE FOR TRIGGERING AN EXTERNAL PROTECTION FUNCTION

(71) Applicant: Robert Bosch GmbH, Stuttgart (DE)

(72) Inventors: Heiko Freienstein, Weil der Stadt (DE); Josef Kolatschek, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 16/492,863

(22) PCT Filed: Mar. 7, 2018

(86) PCT No.: PCT/EP2018/055589
§ 371 (c)(1),
(2) Date: Sep. 10, 2019

(87) PCT Pub. No.: WO2018/172075
PCT Pub. Date: Sep. 27, 2018

(65) Prior Publication Data
US 2021/0138986 A1    May 13, 2021

(30) Foreign Application Priority Data
Mar. 21, 2017  (DE) .......................... 102017204681.3

(51) Int. Cl.
*B60R 21/0134*  (2006.01)
*B60R 21/0132*  (2006.01)
(Continued)

(52) U.S. Cl.
CPC ...... *B60R 21/0134* (2013.01); *B60R 21/0132* (2013.01); *B60R 21/34* (2013.01);
(Continued)

(58) Field of Classification Search
CPC . B60R 21/0134; B60R 21/0132; B60R 21/34; B60R 2021/01013;
(Continued)

(56) References Cited

U.S. PATENT DOCUMENTS

2008/0238641 A1* 10/2008 Mader ................. B60R 21/0136
340/436

FOREIGN PATENT DOCUMENTS

DE    102008043637 A1 *  5/2010   ......... B60R 21/0136
DE    102008043637 A1    5/2010
(Continued)

OTHER PUBLICATIONS

International Search Report dated Jul. 5, 2018 of the corresponding International Application PCT/EP2018/055589 filed Mar. 7, 2018.

*Primary Examiner* — Gertrude Arthur Jeanglaude
(74) *Attorney, Agent, or Firm* — Norton Rose Fulbright US LLP; Gerard Messina

(57) ABSTRACT

A device for triggering at least one external protection function for a motor vehicle for the protection of external road users in particular need of protection, in particular for the protection of pedestrians, includes a control unit for evaluating sensor data from a first sensor system for sensing collision objects and for outputting a first trigger signal for the at least one external protection function, as well as an auxiliary control unit for evaluating sensor data from a second sensor system for sensing collision objects and for directly outputting a second trigger signal for the at least one external protection function if a collision object was detected, the auxiliary control unit being adapted such that the control unit is bypassed when the second trigger signal is output.

16 Claims, 1 Drawing Sheet

(51) Int. Cl.
  *B60R 21/34* (2011.01)
  *B60R 21/01* (2006.01)
(52) U.S. Cl.
  CPC ............... *B60R 2021/0104* (2013.01); *B60R 2021/01013* (2013.01); *B60R 2021/01286* (2013.01); *B60R 2021/01322* (2013.01)
(58) Field of Classification Search
  CPC .. B60R 2021/0104; B60R 2021/01286; B60R 2021/01322
  USPC ........................................................... 701/45
  See application file for complete search history.

(56) References Cited

FOREIGN PATENT DOCUMENTS

| | | | | |
|---|---|---|---|---|
| EP | 0913751 A1 | 5/1999 | | |
| EP | 1792788 A1 | 6/2007 | | |
| JP | 2008094237 A | 4/2008 | | |
| JP | 2009012549 A | 1/2009 | | |
| KR | 20110058279 A | 6/2011 | | |
| KR | 20140134395 A | 11/2014 | | |
| WO | 0196147 A2 | 12/2001 | | |
| WO | 2005077720 A1 | 8/2005 | | |
| WO | WO-2005077720 A1 * | 8/2005 | ........... | B60R 21/013 |
| WO | 2006084884 A1 | 8/2006 | | |
| WO | 2013020739 A1 | 2/2013 | | |

* cited by examiner

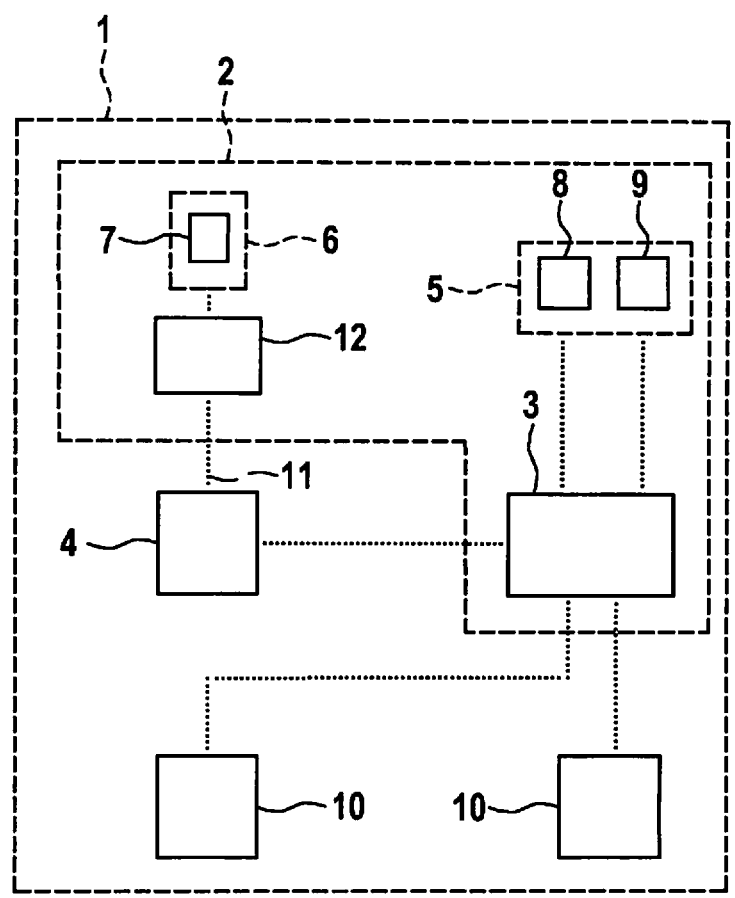

DEVICE FOR TRIGGERING AN EXTERNAL PROTECTION FUNCTION

CROSS-REFERENCE TO RELATED APPLICATIONS

The present application is the national stage of International Pat. App. No. PCT/EP2018/055589 filed Mar. 7, 2018, and claims priority under 35 U.S.C. § 119 to DE 10 2017 204 681.3, filed in the Federal Republic of Germany on Mar. 21, 2017, the content of each of which are incorporated herein by reference in their entireties.

FIELD OF THE INVENTION

The present invention relates to a device and a method for triggering at least one external protection function for a motor vehicle for the protection of external road users in particular need of protection, in particular for the protection of pedestrians.

BACKGROUND

Modern motor vehicles usually have sensors which can detect collisions with objects in the environment of the motor vehicle prior to and/or following a collision. Also known are measures for protecting pedestrians in the event of a collision. As a rule, such measures are activated as soon as the collision has been detected by the sensors. However, the triggering often occurs too late so that pedestrians are not always able to be effectively protected. Especially in situations in which a pedestrian steps into a road directly in front of the vehicle, for instance from a parking space, often no effective protection for the pedestrian can be provided.

SUMMARY

Here, a particularly advantageous device for triggering at least one external protection function for a motor vehicle is provided for the protection of external road users in particular need of protection, especially for the protection of pedestrians.

The described device is preferably situated in a motor vehicle and intended and adapted to protect road users that are located outside the motor vehicle. Hereinafter, such road users are referred to as external road users. Especially pedestrians are road users who are in particular need of protection, because they are normally at a considerable risk of injury in a collision with a motor vehicle. In addition, road users who are in particular need of protection are bicyclists, scooter drivers, and motorcycle riders. The road users who are in particular need of protection all have in common that they are located outside a vehicle that can protect them. The described device is able to offer effective protection in particular to road users who are moving only at a low speed. In most cases, these are pedestrians.

The device has a control unit for evaluating sensor data from a first sensor system for sensing collision objects and for outputting a first trigger signal for the at least one external protection function. Preferably, the first sensor system includes one or a plurality of sensor(s) situated at a shared location or at different locations of the motor vehicle. The sensors of the first sensor system are preferably intended and adapted to detect, in particular in their totality, a collision with a collision object that has already taken place or a collision that is still to occur.

The first sensor system is preferably connected to the control unit so that the sensor data of the first sensor system (or signals from the sensors of the first sensor system) are able to be evaluated by the control unit. An evaluation of the signals in particular means that it is determined based on the signals measured by the sensors whether a collision with a collision object has occurred or will occur, in the context of which information that relates to the type, instant, and severity of the collision is preferably determined as well. In particular, it is preferred that the control unit is connected to a multitude of sensors of the first sensor system, and the control unit makes a decision as to whether a collision has taken place or will take place based on the large quantity of data that is therefore available.

The motor vehicle preferably has the at least one external protection function to be triggered by the described device for the protection of external road users who are in particular need of protection. This can relate to a pedestrian airbag, for instance, which can spread out in particular in the region of a windshield of the motor vehicle in order to protect a pedestrian. An external protection function can also encompass an adjustment device for an engine hood of the motor vehicle. In this case the engine hood is adjusted so that an impact of a pedestrian is damped. In addition, automatic emergency braking is able to be carried out by the at least one external protection function.

In addition, the motor vehicle preferably has a plurality of internal protection functions via which passengers of the motor vehicle are able to be protected. Restraint systems such as airbags or belt tensioners, in particular, are among them. Both the internal and the at least one external protection function are preferably connected to the control unit. The control unit preferably makes a decision as to whether, and if so, which particular protection functions are triggered in the event of a detected collision. In particular, the control unit is intended and adapted to output a first trigger signal for the at least one external protection function in the event of a detected collision with an external road user in particular need of protection. The first trigger signal can preferably be received by the at least one external protection function, as a result of which the at least one external protection function is triggered.

The triggering of the at least one first external protection function via the control unit and the first sensor system can take too long for an effective protection of the external road user in need of protection. For this particular reason, the described device has an auxiliary control unit for the evaluation of sensor data from a second sensor system for sensing collision objects and for the direct output of a second trigger signal for the at least one external protection function. The second sensor system is preferably intended and adapted to detect collision objects in the environment of the motor vehicle. The sensor data recorded and output by the second sensor system can be analyzed using the auxiliary control unit. The auxiliary control unit can directly output a second trigger signal for the at least one external protection function when a collision object has been detected. The auxiliary control unit is adapted in such a way that the control unit is bypassed when the second trigger signal is output. This means that the second sensor system is preferably developed in such a way that the second trigger signal is able to be output directly by the auxiliary control unit in such a form that the at least one external protection function is able to receive the second trigger signal and process it so that the at least one external protection function will be triggered as a result. Because of the direct connection between the auxiliary control unit and the at least one external protection function, the at least one external protection function is able to be triggered in an especially rapid manner. This is facilitated in particular by bypassing the control unit. Toward this end, the auxiliary control unit is preferably connected to the at least one external protection function via a direct connection. The direct connection can also be considered a bypass of the control unit. The second sensor system, too, is able to be connected to the control unit. The second sensor system preferably outputs signals (also) to the control unit so that the information obtained by the second sensor system is able to be used for further measures as well. The second trigger signal, too, is preferably forwarded to the control unit by the auxiliary control unit. It is preferred in this case that the output of the second trigger signal to the at least one protection function will not be delayed by a communication between the auxiliary control unit and the control unit.

Because of the described device, the at least one protection function is able to be triggered already prior to a collision, in particular. This allows for greater design freedom for a front side of the motor vehicle. An effective protection of pedestrians during slow triggering is possible only if the front side of the vehicle has an engine hood that is essentially disposed horizontally. If a collision with a pedestrian takes place, the pedestrian will first be hit in the legs, for example, but the time until the head of the pedestrian strikes the windshield, for instance, can be sufficient to trigger a pedestrian airbag according to a relatively slow method. Using the described device, which allows for a particularly rapid triggering of the at least one external protection function, an effective protection of pedestrians is achievable, in particular also in the case of a flat vehicle front (which, for instance, can also be situated essentially perpendicular to a road surface).

If the at least one external protection function is triggered, this can particularly cause the field of vision of the driver to be restricted. For instance, this is the case with a pedestrian airbag that covers the windshield. If such an external protection function is triggered, at least one driver assistance system will preferably be activated. For example, automated lane keeping inside a lane can be realized in this way (so that an abrupt pull on the steering wheel by the driver is suppressed), and/or an automated evasive maneuver and/or an automated emergency braking operation is/are able to be carried out. Such an intervention can prevent further damage caused by the triggering of a pedestrian airbag, for example, because the driver is no longer able to see. It is also preferred that a system for autonomous driving is activated (provided it is not already active) by the triggering of the at least one protection function. An electronic control unit then assumes the entire driving task and controls the motor vehicle, in particular in such a way that further damage is avoided.

In an example embodiment of the device, the first sensor system includes both at least one environment sensor and at least one contact sensor.

A collision with a pedestrian is detectable in particular when using a contact sensor, which is mounted on the front side (e.g., on or under an engine hood) of the motor vehicle. The contact sensor in particular can be an acceleration sensor using which a slight acceleration that occurs in a collision with a pedestrian is measurable as early as possible. A contact sensor makes it possible to detect a collision that has already taken place. In order to be able to detect an upcoming collision as well, the first sensor system also includes the at least one environment sensor. The environment sensor is intended and adapted to monitor the environment of the motor vehicle in such a way that potential collision objects are able to be detected and a prognosis can be rendered as to whether a collision with a detected possible collision object is imminent. Toward this end, a respective expected trajectory for all detected potential collision objects is preferably ascertained based on a respective movement of the possible collision objects and then compared to an expected trajectory of the motor vehicle.

In an example embodiment of the device, the first sensor system includes at least one sensor of one of the following sensor types: an optical sensor, a video sensor, an ultrasonic sensor, a capacitive sensor, and an inductive sensor.

For example, the optical sensor can be an infrared sensor and/or a lidar sensor. The optical sensor can also be intended and adapted to receive laser light emitted by a laser and reflected by an object. The video sensor can particularly be developed in the way of a video camera. The video sensor can be sensitive to brightness and/or colors. The ultrasonic sensor can emit an ultrasonic wave and receive it following the reflection at an object. By measuring the propagation time of the (preferably pulsed) ultrasonic wave, the distance between the object and the sensor is able to be determined. The capacitive sensor includes at least one capacitor. In particular, the capacitive sensor can be developed as a distance sensor, in which case the capacitor is developed between an electrode of the capacitive sensor and an (at least partially electrically conductive) object in the environment of the sensor. The distance between the capacitive sensor and the object in its environment is able to be estimated by measuring the capacitance of the capacitor formed in this way. An inductive sensor includes at least one coil, e.g., of copper wire. It is able to generate a magnetic field. An object in the environment of the sensor can modify the magnetic field so that the object is detectable by measuring the magnetic field.

In an example embodiment of the device, the second sensor system is adapted to monitor a near range, which particularly extends up to 5 m in front of the motor vehicle.

Using the first sensor system in conjunction with the control unit, collision objects in the environment of the motor vehicle are able to be detected in a particularly reliable manner. Especially detailed information about the collision object (for instance pertaining to the size, shape, speed, classification, density and/or movement direction) can be detected. In particular, a multitude of data is able to be evaluated and compared in the control unit. For example, a signal from a first sensor of the first sensor system is able to be checked for plausibility by comparing it to a signal from a second sensor of the first sensor system. Moreover, in the control unit a selection can be made from among a multiplicity of protection functions as to which are to be triggered in a certain detected situation, in which sequence and at which point in time, so that the passengers of the motor vehicle and possible external road users are optimally protected. Using the first sensor system in conjunction with the control unit, it is therefore possible to achieve a protection that is optimally adapted to a certain situation for all involved parties. However, this necessitates a considerable processing power, which requires corresponding time. If a collision object enters the monitored region of the environment in front of the motor vehicle only shortly before an imminent collision, then it can happen that the required triggering of the at least one external protection function by the first sensor system in conjunction with the control unit will possibly not be triggered soon enough. For example, this can be the case when a pedestrian steps into the street directly in front of the motor vehicle from a parking spot or a gap between two vehicles parked next to each other. The second sensor system including the auxiliary control unit is provided for such a case, in particular.

The environment of the motor vehicle monitored by the described device is preferably subdivided into a near range and a far range. The first sensor system preferably monitors the far range, in particular. A collision object that enters the monitored region at a sufficiently large distance in front of the motor vehicle is preferably detected by the first sensor system, and the comprehensive data available in this context are processed by the control unit so that the optimum protection for all involved parties is achieved. In such a case, there is sufficient time for the required complex calculations. However, if the collision object enters the near region in front of the motor vehicle, then the remaining time until the collision can be too short. In this case, the at least one external protection function is preferably triggered directly by the auxiliary control unit, without complex calculations being carried out in the control unit or in other electronic components.

The near range preferably describes the region in front of the motor vehicle that extends from the front side of the motor vehicle up to 5 m, and in particular only up to 3 m in front of the motor vehicle. This relatively short distance results from the speed within city limits of approximately 50 km/h and a short activation time of potential pedestrian external airbags of less than 100 ms. Toward the side, the near range preferably extends at least across the full width of the motor vehicle. It is also preferred that the near range extends in the form of a circle segment having a radius in the range of 3 m to 5 m and a forward-directed (i.e., in front of the motor vehicle) opening angle in the range of 120° to 180°. The far range includes at least the region that adjoins the near range. The near range and the far range can partially overlap. It is also possible that the near range is a subregion of the far range, so that even the far range starts at the front side of the motor vehicle. In this case, a collision object in the immediate vicinity in front of the motor vehicle can cause the triggering both of the first and the second trigger signals for the at least one external protection function. However, it is then to be expected that the first trigger signal reaches the at least one external protection function only after the second trigger signal, or in other words, when the at least one external protection function has already been triggered. However, the first trigger signal does not do any harm in this case. In a malfunction of the second sensor system (or the auxiliary control unit), the second trigger signal can fail to occur. In such a case, at least the first trigger signal can still trigger the at least one external protection function (at a later point).

In an example embodiment of the device, the second sensor device includes at least one line scanner.

The line scanner is preferably intended and adapted to measure a distance between the sensor and an object located in the environment of the line scanner for a multitude of measuring points (which also can be continuously distributed) situated in a plane in the environment of the line scanner. That is to say, the line scanner makes it possible to detect a distance profile of the environment of the line scanner situated along a line. The line scanner preferably includes a laser aligned in the environment of the line scanner, whose alignment is continually variable along the line to be measured. The laser preferably has an invisible wavelength and a light intensity that does not pose a danger to people. Using an optical sensor, which is sensitive in particular to the wavelength of the laser, light is detectable that has been emitted by the laser and been reflected by an object into its environment. By measuring a propagation time of the laser light, it is possible to detect at what distance an object is located in front of the laser. For this purpose, the laser light can be emitted in a pulsed manner, for example.

Using the line scanner, especially collision objects in the near range in front of the motor vehicle are detectable in a particularly rapid manner. Accordingly, especially rapid triggering of the at least one external protection function by the auxiliary control unit is able to take place. In addition, a line scanner can have an especially simple design so that costs are able to be saved. This is advantageous in particular when the line scanner is used only for the triggering of the at least one external protection function in the event that collision objects are detected in the near range. Especially for components such as the line scanner that serve only a single purpose, an advantageous development can be required for economic reasons.

In an example embodiment of the device, the line scanner has at least one controllable deflection mirror by which at least one laser beam of the line scanner is able to be deflected in such a way that the at least one laser beam is able to scan a scanning region in front of the motor vehicle.

In this embodiment, the laser of the line scanner is preferably kept stationary, and the adjustment of the alignment of the laser beam is able to be achieved using the deflection mirror. In particular, the deflection mirror can have a smaller and lighter design than the laser so that the deflection mirror is adjustable in an especially rapid manner. In this way, a particularly high scanning rate is achievable. The deflection mirror can preferably be controlled in such a way that it is adjustable by an electronic signal. Preferably, the electronic signal is a periodic signal so that the deflection mirror continually adjusts the alignment of the laser beam along the line to be scanned.

The scanning range in front of the motor vehicle that is able to be scanned by the laser beam preferably includes at least the near range and more specifically, is preferably identical to the near range.

In an example embodiment of the device, the second sensor system includes at least two line scanners, which have at least partially overlapping scanning regions.

It is preferred that the scanning regions are situated in such a way that they completely cover the near range in their totality. It is especially preferred that the scanning of the respective scanning regions by the individual line scanners is carried out in a common plane. If the near region is scanned by more than one line scanner, then a particularly high scanning rate is achievable because only a subregion of the near region needs to be scanned by each line scanner.

More specifically, it is preferred that the at least two line scanners are situated at a front side of the motor vehicle and are adapted to scan an angular range that opens toward the front in the range of 90° to 120° in the environment of the motor vehicle, in which case an overlap region exists centrally in front of the front side of the motor vehicle in which the scanning regions of the two line scanners overlap. In this case it is preferred that the total region scanned by the two line scanners covers an angular range of 180° in total in front of the motor vehicle. A separate line scanner is preferably situated at the two front corners of the motor vehicle (e.g., in the region of the headlights) in each case.

It is possible that a region is formed between the scanning regions of the individual line scanners that is covered by none of the line scanners. Such a region is preferably formed only directly in front of the front side of the motor vehicle so that a protection of external road users who are first detected in this region is impossible anyway. For example, such a region can extend up to 50 cm in front of the motor vehicle.

In an example embodiment of the device, the second sensor system includes a plurality of line scanners which are situated on top of one another and adapted to scan different planes in each case in order to detect contour features of collision objects.

In this embodiment, it is preferred that the entire near range is able to be scanned by each of the plurality of line scanners. Alternatively, it is preferred that multiple line scanners are situated in such a way that they are jointly able to scan the entire near region in a plurality of different planes. This involves a combination of the features of this embodiment and the features of the previously described embodiment.

The different planes preferably have a shared section axis, which extends parallel to the front side of the motor vehicle and to a road surface. That means that a line parallel to the road surface is able to be scanned by each line scanner, the different lines of the different line scanners being situated at different heights above the road surface. By scanning different planes, the contour features of the collision objects in the environment of the motor vehicle are able to be detected. In particular, the size of the collision objects is additionally detectable in this manner. The auxiliary control unit preferably outputs the second trigger signal only when a collision object having a minimum size has been detected by the second sensor system. In this way it can be ensured that the at least one external protection function will not be triggered in error. For example, it can be stipulated as a condition that the auxiliary control unit outputs the second trigger signal only if a collision object was detected in the signals from at least two of the line scanners so that a corresponding minimum size of the collision object can be inferred. Such a simple condition is able to be checked without any time-intensive processing work, in particular in the auxiliary control unit.

In an example embodiment of the device, the auxiliary control unit has a latency time starting from the sensing of a collision object by the second sensor system to the triggering of a second trigger signal of maximally 80 m, in particular maximally 50 ms.

The first detection of the collision object is defined as the first measurement of laser light that was reflected by the collision object. For instance, this particularly means that the latency time includes the time required to generate an electrical signal from the received reflected laser light in the second sensor system; to process this electrical signal in the auxiliary control unit; to decide whether to trigger the at least one external protection function in the auxiliary control unit; and to generate and transmit the second trigger signal to the at least one external protection function.

If the latency time amounts to 80 ms, for instance, then the vehicle travels across a distance of slightly more than one meter at a speed of 50 km/h. Including the time for triggering the at least one external protection function (of 30 m, for example), the at least one external protection function can still be triggered with sufficient speed in the case of a collision object that was detected at a distance of 1.5 m in front of the motor vehicle.

A short latency time of the auxiliary control unit, as described, can particularly be achieved because of the use of line scanners in the second sensor system. The latency time can be affected by the development of the line scanner, in particular.

In an example embodiment of the device, the auxiliary control unit has a latency time starting from the sensing of a collision object by the second sensor system to the triggering of a second trigger signal, that is maximally half as long as a latency time of the control unit starting from the sensing of a collision object by the first sensor system to the triggering of a first trigger signal.

When triggering protection functions, a particularly detailed evaluation of the available data must be weighed against a particularly rapid triggering. The more time is used for the evaluation of the data, the better the triggering of the protective functions is adaptable to the respective situation. In addition, faulty triggering events are able to be prevented in a particularly satisfactory manner by an especially precise evaluation of the data. On the other hand, rapid triggering without a complex evaluation of the data makes it possible to provide protection even when the available time is very short. In the described device, a comprehensive analysis of the data is able to be carried out by the first sensor system in conjunction with the control unit, so that the corresponding advantages are achievable. In addition, however, an intervention by the second sensor system in conjunction with the auxiliary control unit is possible in those instances in which the first sensor system and the control unit are unable to react quickly enough.

It is therefore preferred that the latency times of the control unit and the auxiliary control unit are of different lengths. It has been shown in tests that it is particularly advantageous if the latency time of the auxiliary control unit is at most half as long (and in particular exactly half as long) as the latency time of the control unit.

Introduced as a further aspect is a method for triggering at least one external protection function for a motor vehicle for the protection of external road users in particular need of protection, in particular for the protection of pedestrians.

The special advantages and embodiment features described earlier in connection with the device are applicable and transferrable to the described method, and vice versa. In particular, it is preferred that the described method is carried out using a device that is configured as described.

In step a) of the described method, a control unit evaluates first sensor data for sensing collision objects. Preferably, the first sensor data are recorded using the first sensor system described earlier in the text. In step b), an auxiliary control unit evaluates second sensor data for sensing collision objects. The second sensor data are preferably recorded using the second sensor system that was described earlier in the text. The method steps a) and b) are preferably carried out simultaneously and preferably in particular across an entire operating period of the motor vehicle (i.e., starting with the startup of the internal combustion engine until the internal combustion engine is shut down).

In step c), the control unit outputs a first trigger signal for the at least one external protection function if a collision object was detected in step a). In step d), the auxiliary control unit directly outputs a second trigger signal for the at least one external protection function if a collision object was detected in step b). The control unit is bypassed when the second trigger signal is output. The output of the first trigger signal in step c) in particular takes place only in the event that a collision object was detected by the first sensor system. The output of the second trigger signal in step d) in particular occurs only in the event that a collision object was detected by the second sensor system. Thus, only the steps a) and b) are carried out on a regular basis during the operation of the motor vehicle. Steps c) and/or d) are executed in addition only in case of an imminent or occurred collision. By bypassing the control unit when the second trigger signal is output, it can be assumed that the second trigger signal is regularly output more quickly than the first trigger signal. For this particular reason situations can occur in which only step d) is performed in addition to steps a) and b).

An example embodiment is directed to a computer program which is adapted to execute all of the steps of the described method, and an example embodiment is directed to a machine-readable memory medium on which this computer program is stored.

Further details of the described device and an example embodiment will be described in greater detail on the basis of the drawing. The possible embodiments of the described device are not restricted to the example embodiment shown in the drawing.

BRIEF DESCRIPTION OF THE DRAWING

The FIGURE schematically represents a device according to an example embodiment of the present invention.

DETAILED DESCRIPTION

The FIGURE shows a device 2 for triggering an external protection function 4 for a motor vehicle 1 for the protection of external road users in particular need of protection, especially for the protection of pedestrians. Device 2 has a control unit 3 for evaluating sensor data from a first sensor system 5 for sensing collision objects and for outputting a first trigger signal for the at least one external protection function 4. It also has an auxiliary control unit 12 for evaluating sensor data of a second sensor system 6 for sensing collision objects and for directly outputting a second trigger signal for the at least one external protection function 4. The triggering of the first trigger signal or the second trigger signal takes place when a collision object was detected. Auxiliary control unit 12 is adapted in such a way that control unit 3 is bypassed when the second trigger signal is output.

First sensor system 5 includes both an environment sensor 8 and a contact sensor 9. Second sensor system 6 is adapted to monitor a near range, which particularly extends within 5 m in front of motor vehicle 1. Second sensor system 6 includes a line scanner 7 or some other sensor for the near range. In addition, second sensor system 6 and auxiliary control unit 12 are developed in such a way that a latency time from the sensing of a collision object by second sensor system 6 to the triggering of a second trigger signal amounts to maximally 80 ms. A latency time of control unit 3 starting from the sensing of a collision object by first sensor system 5 to the triggering of a first trigger signal amounts to 160 ms.

In addition, motor vehicle 1 has two internal protection functions 10 via which passengers of motor vehicle 1 are able to be protected. Data that were acquired by first sensor system 5 are able to be evaluated using control unit 3, and a decision is made through a comprehensive analysis whether the first trigger signal for triggering external protection function 4 will be output. Such a comprehensive analysis can take too long to trigger external protection function 4 in a timely manner (i.e., prior to the collision), in particular. Auxiliary control unit 12, and furthermore also second sensor system 6, are directly connected to external protection function 4 via a direct connection 11. Auxiliary control unit 12 thus is able to forward the second trigger signal directly to external protection function 4, while control unit 3 is bypassed. As a result, external protection function 4 is able to be triggered more rapidly via the second trigger signal than via the first trigger signal.

What is claimed is:

1. A device for triggering at least one external protection function for a motor vehicle for the protection of an external road user and/or a pedestrian, comprising:
    a first control unit to evaluate sensor data from a first sensor system and detect collision objects, and to output a first trigger signal to trigger the at least one external protection function responsive to the detection by the first control unit; and
    a second control unit to evaluate sensor data from a second sensor system and detect collision objects, and directly output a second trigger signal to trigger the at least one external protection function responsive to the detection by the second control unit;
    wherein the second control unit is configured such that the first control unit is bypassed when the second trigger signal is output, and
    wherein the second control unit has a latency time between sensing a collision object by the second sensor arrangement and triggering the second trigger signal that is no more than half as long as a latency time of the first control unit between sensing a collision object by the first sensor arrangement and triggering the first trigger signal.

2. The device of claim 1, wherein the at least one external protection function is of a device by which external pedestrians are protected.

3. The device of claim 1, wherein the first sensor system includes both at least one environment sensor and at least one contact sensor.

4. The device of claim 1, wherein the first sensor system includes an optical sensor, a video sensor, an ultrasonic sensor, a capacitive sensor, and/or an inductive sensor.

5. The device of claim 1, wherein the second sensor system is configured to monitor a near range that extends up to 5 meters in front of the motor vehicle.

6. The device of claim 1, wherein the second sensor system includes at least one line scanner.

7. The device of claim 6, wherein the line scanner has at least one controllable deflection mirror by which at least one laser beam of the line scanner is deflectable so that the at least one laser beam is able to scan a scanning region in front of the motor vehicle.

8. The device of claim 6, wherein the second sensor system includes at least two line scanners that have at least partially overlapping scanning regions.

9. The device of claim 6, wherein the second sensor system includes a plurality of line scanners which are situated on top of one another and adapted to scan different planes in each case to detect contour features of collision objects.

10. The device of claim 1, wherein the second control unit is configured so that the triggering of the second trigger signal occurs after passage of a latency time period, of up to 80 millisecond, that begins when the second control unit detects a collision object.

11. The device of claim 1, wherein the first control unit is configured so that the triggering of the first trigger signal occurs after passage of a first latency time period that begins when the first control unit detects a collision object, and wherein the second control unit is configured so that the triggering of the second trigger signal occurs after passage of a second latency time period, of up to half as long as the first latency period, that begins when the second control unit detects a collision object.

12. The device of claim 1, wherein a latency time from the sensing of a collision object by the second sensor system to the triggering of the second trigger signal amounts to a maximum of about 80 ms, and a latency time of the first control unit starting from the sensing of a collision object by the first sensor system to the triggering of a first trigger signal amounts to a maximum of about 160 ms.

13. A method for triggering at least one external protection function for a motor vehicle for the protection of an external road user and/or a pedestrian, the method comprising:
- a first control unit to evaluate sensor data from a first sensor system and thereby detecting a collision object, wherein the first control unit is configured to output a first trigger signal to trigger the at least one external protection function responsive to the detection by the first control unit; and
- a second control unit to evaluate sensor data from a second sensor system and detect a collision object;
- wherein the second control unit directly outputs a trigger signal to trigger the at least one external protection function responsive to the detection by the second control unit, and wherein the function of the first control unit to perform its output is bypassed when the second trigger signal is output, and
- wherein the second control unit has a latency time between sensing a collision object by the second sensor arrangement and triggering the second trigger signal that is no more than half as long as a latency time of the first control unit between sensing a collision object by the first sensor arrangement and triggering the first trigger signal.

14. The method of claim 13, wherein a latency time from the sensing of a collision object by the second sensor system to the triggering of the second trigger signal amounts to a maximum of about 80 ms, and a latency time of the first control unit starting from the sensing of a collision object by the first sensor system to the triggering of a first trigger signal amounts to a maximum of about 160 ms.

15. A non-transitory computer-readable medium having a computer program, which is executable by a processor device, the method comprising:
- a program code arrangement having program code for triggering at least one external protection function for a motor vehicle for protecting an external road user and/or a pedestrian, by performing the following:
  - evaluating, via a first control unit, sensor data from a first sensor system and detecting a collision object, wherein the first control unit is configured to output a first trigger signal to trigger the at least one external protection function responsive to the detection by the first control unit; and
  - evaluating, via a second control unit, sensor data from a second sensor system and detecting a collision object;
- wherein the processor device includes the first control unit and the second control unit,
- wherein the second control unit directly outputs a trigger signal to trigger the at least one external protection function responsive to the detection by the second control unit,
- wherein the function of the first control unit to perform its output is bypassed when the second trigger signal is output, and
- wherein the second control unit has a latency time between sensing a collision object by the second sensor arrangement and triggering the second trigger signal that is no more than half as long as a latency time of the first control unit between sensing a collision object by the first sensor arrangement and triggering the first trigger signal.

16. The computer-readable medium of claim 15, wherein a latency time from the sensing of a collision object by the second sensor system to the triggering of the second trigger signal amounts to a maximum of about 80 ms, and a latency time of the first control unit starting from the sensing of a collision object by the first sensor system to the triggering of a first trigger signal amounts to a maximum of about 160 ms.

\* \* \* \* \*